UNITED STATES PATENT OFFICE.

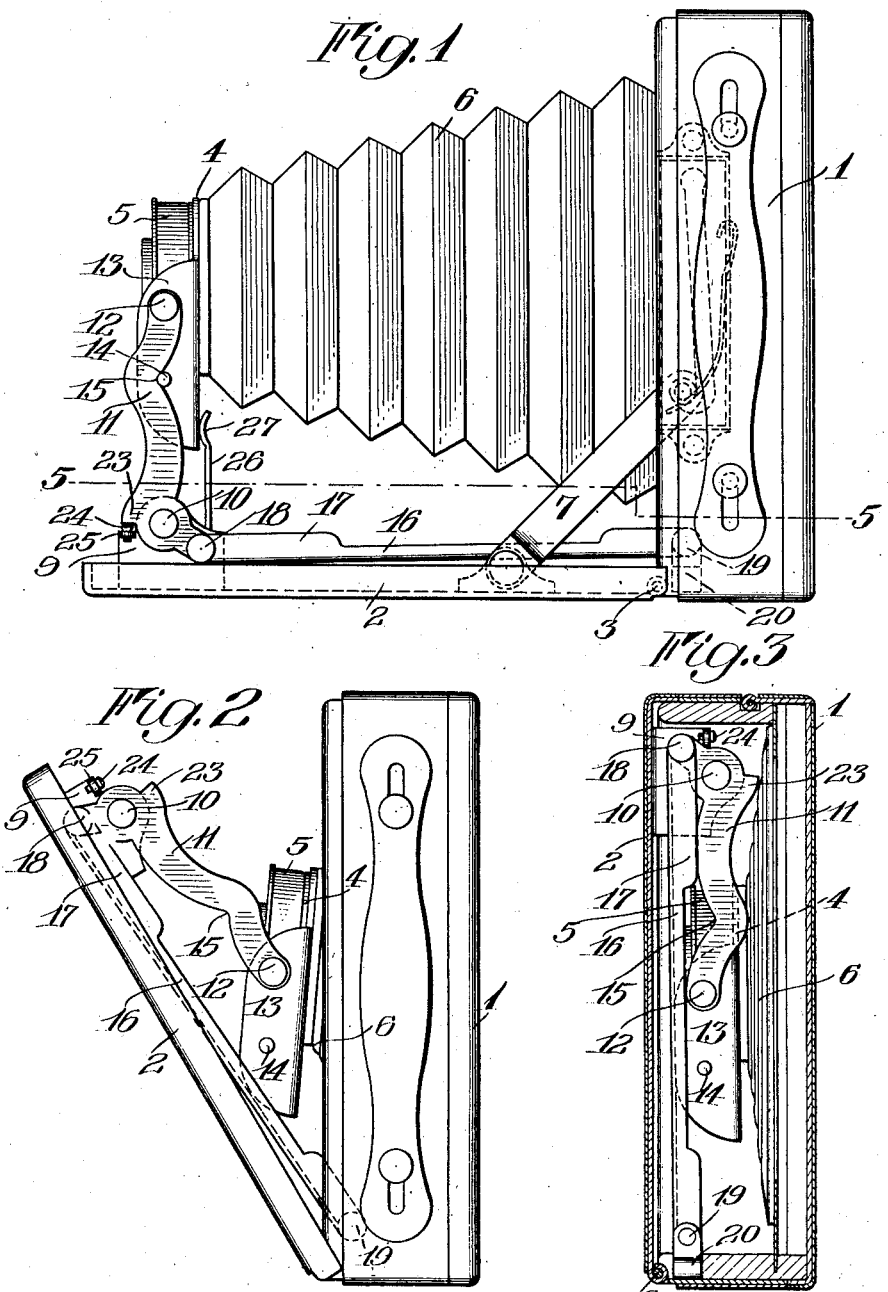

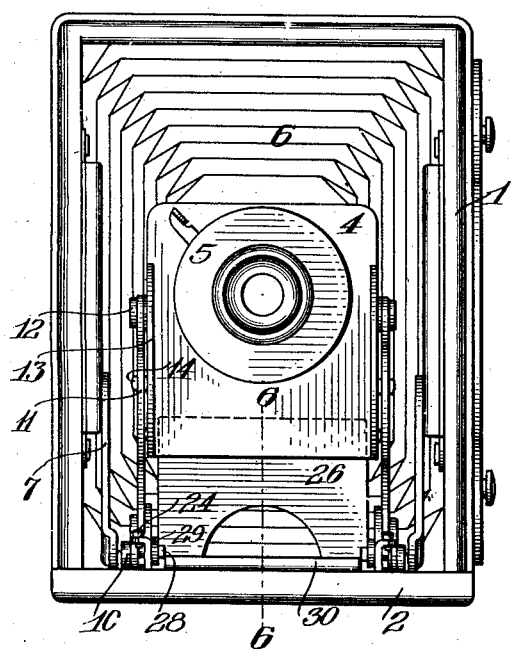
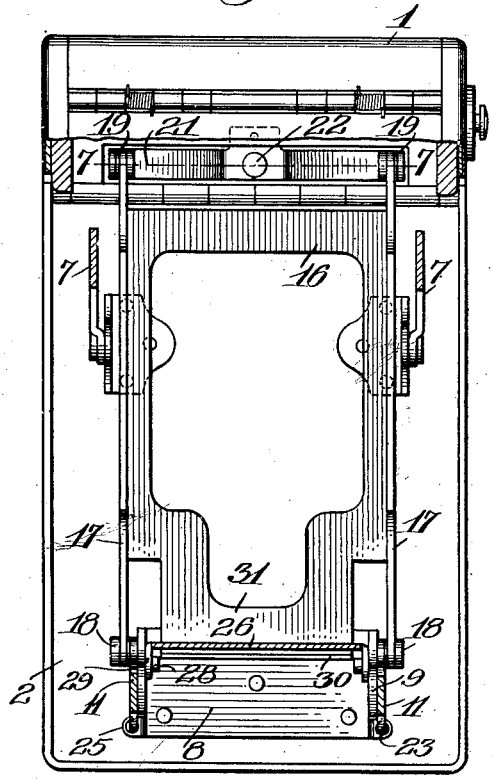
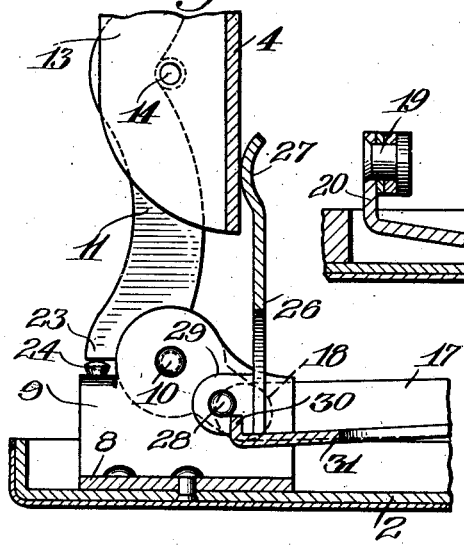
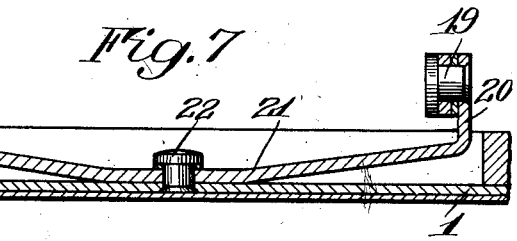

CHARLES E. HUTCHINGS, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

1,321,101.      Specification of Letters Patent.      Patented Nov. 11, 1919.

Application filed August 15, 1918. Serial No. 250,058.

*To all whom it may concern:*

Be it known that I, CHARLES E. HUTCHINGS, a citizen of the United States, residing at Rochester, in the county of Monroe and State of New York, have invented certain new and useful Improvements in Folding Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras of the folding type in which the front is so mounted upon the hinged bed and door that it erects itself automatically as the camera is opened, and the invention has for its object to provide a simple, strong and positively acting mechanism for so erecting the front. The further object of the invention is to firmly maintain the front in its exact operative position without complicating the mechanism or requiring great accuracy in assembling it. To these and other ends the invention consists in certain improvements and combinations of parts, all as will be hereinafter more fully described, the novel features being pointed out in the claims at the end of the specification.

In the drawings:

Figure 1 is a side elevation of a folding camera constructed in accordance with and illustrating one embodiment of my invention, the same being shown in extended position, Fig. 2 is a similar view showing the camera partially folded, Fig. 3 is a vertical sectional view in a plane adjacent to one of the side walls of the camera with the latter completely folded, Fig. 4 is a front elevation, Fig. 5 is a plan view of the bed with the body partially in section and broken away, the section being on the line 5—5 of Fig. 1, Fig. 6 is an enlarged fragmentary section taken on the line 6—6 of Fig. 4, and Fig. 7 is an enlarged detail section taken substantially on the line 7—7 of Fig. 5.

Similar reference numerals in the several figures indicate the same parts.

The camera shown in the present embodiment of the invention is a folding plate holding camera of a familiar type, embodying generally a body 1, a hinged bed 2 closing the front thereof and turning on the pintle 3; a front or lens board 4 carrying the shutter and lens casing 5 and a bellows 6 connecting the front and body. The bed 2 is held rigidly in its horizontal projected position by the usual links 7 slidably connected to the body in a manner well known to those skilled in the art.

At a forward point on the bed I secure the bracket plate 8, having side arms or ears 9 to which are pivoted at 10 levers 11 that are adapted to fold rearwardly and downwardly, as shown in Figs. 2 and 3. These constitute supporting arms for the front 4, and they are pivoted at 12 to forwardly extending lateral flanges 13 on the front. Also carried on these flanges are laterally extending stop-pins 14, which take into depressions 15 in the rear edges of the arms when the latter are erect, and define the operative position of the front. When the camera is folded and the arms are swung rearwardly, the front rocks forwardly, as shown in Figs. 2 and 3, and in the completed folded position shown in the latter figure, the front and its supporting arms lie in substantially the same plane parallel with and against the bed 2.

To automatically erect the front as the bed is extended, I provide a link plate 16 that overlies the bed rather close to it and has side rails or flanges 17 pivoted at their forward ends at 18 to the lower branches of the respective lever arms 11, and pivoted at their rear ends at 19 to ears 20 at the extremities of a leaf spring 21 secured at 22 to the floor of the body 1. The axis 19 of this link is spaced from the axis 3 of the bed, and it will be seen from a comparative inspection of Figs. 1, 2 and 3 showing different positions of the bed, that as it is folded, the link plate 16 will rock the supporting arms rearwardly and fold the front, while upon extending the bed the link plate will draw upon the lever arms and cause them to assume the erect position of Fig. 1. The forward movement is limited by the engagement of shoulders 23 thereon with adjusting screws 24 threaded vertically into lugs 25 on the bracket ears 9.

It remains to provide for holding the front 4 in proper relationship with its supporting arms 11 with the stop-pins 14 in the recesses 15. This I accomplish by pivoting to the inner sides of the bracket ears 9 to lie between the arms 11, a plate or arm 26, having a contact portion 27 in rear of and adapted for a forward engagement with the front or lens board 4. The pivots of the said arm 26 indicated at 28 are off-set forwardly in ears 29 on the said arm or plate 26, and at the forward end of the link plate 16 is a flange or shoulder 30 adapted to engage on the front of the arm 26 near its lower edge. In rear of the shoulder 30, the link plate 16 is cut away at the sides to provide a spring tongue 31. In fact in the present instance, the flange or shoulder 30 is formed at the forward end of this spring tongue.

When the camera is opened and the link plate 16 draws rearwardly, the shoulder 30 draws the lower end of the arm 26 rearwardly and rocks the upper or main portion of the arm forwardly against the rear of the front 4, straightening it into its upright position. At the same time, because of the off-set pivots 28, the spring tongue 31 is flexed downwardly and energized, the contacting portion of the arm 26 at its lower edge moving on an arc that first proceeds downwardly and rearwardly. As soon as it passes the dead center, the spring tongue 31 comes into action and completes its movement rearwardly and upwardly (still referring to the said contacting edge) so that said edge leaves the shoulder 30, as shown in Fig. 6, and the forward swing of the upper contacting end 27 of the arm against the rear of the front is completed by the spring action. Thereafter the tongue, through the arm 26, continues to exert a light pressure against the rear of the front near the latter's lower edge and to hold its stop-pins 14 in the depressions 15 of the arms 11.

It will be seen that during the foregoing movements, the forward portion of the link plate 16 is moving upwardly away from the bed on the centers 10 and increasing the tension of the spring 31. Conversely, during the folding movement, the spring tongue is carried away from its engagement by the forward and downward swing of the link, and the arm 26 thereupon falls rearwardly on its off-set centers, allowing the front to free itself therefrom and fold as heretofore described. The supporting arms 11 always carry the front to a position forwardly of the arm 26 before the latter begins to rise.

I claim as my invention:

1. In a folding camera, the combination with a body and a bed hinged thereto, of a front, supporting arms therefor pivoted thereto and to the body, a link pivoted to the arms and to the body, the latter pivot being removed from the axis of the bed hinge, and an arm pivoted to the bed between the front supporting arms and actuated by the link to engage the rear face of the front and maintain it in operative position.

2. In a folding camera, the combination with a body and a bed hinged thereto having a two armed bracket, of a front, supporting arms pivoted to the front and to the other sides of the respective arms of the bracket, a link pivoted to the supporting arms and to the body, the latter pivot being removed from the axis of the bed hinge and an arm pivoted between the arms of the bracket and actuated by the link to engage the rear face of the front and maintain it in operative position.

3. In a folding camera, the combination with a body, and a bed hinged thereto, of a front, supporting arms pivoted at their upper ends to the front and at intermediate points to the bed, a link pivoted to the body to turn on a center different from that of the hinged bed and also pivoted to the lower ends of the supporting arms, said link being provided with a shoulder located between the latter and an arm pivoted to the bed between the front supporting arms and adapted to be engaged by the shoulder on the link and thereby actuated against the rear of the front to maintain the latter in operative position.

4. In a folding camera, the combination with a body and a bed hinged thereto, of a front, supporting arms pivoted at their upper ends to the front and at intermediate points to the bed, a link pivoted to the body to turn on a center different from that of the hinged bed and also pivoted to the lower ends of the supporting arms, said link being provided with a shoulder and with a resilient portion adjacent thereto, and an arm pivoted to the bed to engage the front and maintain it in operative position, said arm being first actuated by the shoulder and then by the resilient portion as the camera is unfolded and the bed fully projected.

5. In a folding camera, the combination with a body and a bed hinged thereto, of a front, supporting arms pivoted at their upper ends to the front and at intermediate points to the bed, a link pivoted to the body to turn on a center different from that of the hinged bed and also pivoted to the lower ends of the supporting arms, said link being provided with a shoulder at its forward end located between the supporting arms and with a spring tongue in rear of the shoulder and an arm pivoted to the bed on an offset pivot to swing between the supporting arms and adapted to maintain the front in operative position, said arm being adapted to be first swung rearwardly at its lower end and upwardly and forwardly at its upper end by the engagement of the shoulder on the link therewith and to simultaneously place the spring tongue under tension and to then be actuated to the completion of its movement by the said spring tongue.

CHARLES E. HUTCHINGS.